Patented Feb. 5, 1929.

1,701,265

UNITED STATES PATENT OFFICE.

HUGO HOFMANN, OF JOHNSON CITY, TENNESSEE, ASSIGNOR TO AMERICAN BEMBERG CORPORATION, OF NEW YORK, N. Y., A CORPORATION OF DELAWARE.

RECOVERY OF AMMONIA FROM DILUTE SOLUTION.

No Drawing. Application filed January 29, 1927, Serial No. 164,656, and in Germany May 6, 1924.

The present application is a continuation in part and in part an improvement upon my prior and copending application Serial 24,881 filed April 21, 1925, and for which I filed applications in Germany, filed May 6, 1924; in Great Britain, filed March 23, 1925, Patent 233,669 of December 17, 1925; in Hungary, filed March 26, 1925; in Italy, filed March 30, 1925; in Austria, filed March 30, 1925; in Canada, filed April 24, 1925; in France, filed May 5, 1925; in Japan, filed May 2, 1925; in Czechoslovakia, filed April 7, 1925; in Spain, filed April 2, 1925; in Switzerland, filed March 26, 1925; in Belgium, filed May 6, 1925; in Russia, filed August 5, 1925.

This invention relates generally to a process for the economical recovery of ammonia from aqueous solutions of relatively low concentration.

The recovery of ammonia from weak liquors in which the ammonia content approximates 1 or 2 per cent is ordinarily initiated by a preliminary concentration of the ammonia in stills up to a strength of 10 to 15 per cent, which renders the liquor capable of being more conveniently and economically handled. There are, however, processes in the industrial arts in which large quantities of aqueous ammonia solutions having a concentration of less than five hundredths (.05) of a per cent are used. It is impractical to recover ammonia economically from solutions as dilute as this by a process of distillation.

It is a general object of the present invention to provide an economical method of recovery of ammonia from aqueous solutions of relatively low concentration including more especially the precipitant used in the manufacture of artificial filaments by the cuprammonia process.

The present application is in part a continuation of, and in part an improvement upon my application, Serial No. 24,881, filed April 21, 1925, in which I have claimed processes for recovering ammonia from dilute solutions by adding magnesium phosphate to said solutions to produce magnesium ammonium phosphate, and have also claimed certain methods for producing magnesium phosphate in said solutions to effect the precipitation.

The invention herein described comprises a process for the treatment of dilute aqueous ammonia solutions by adding to the solutions chemical compounds which react with each other within the solution to produce a substance that will effect the desired precipitation of the ammonia. A number of examples of the process by which an active transitory product, that will precipitate ammonia, is produced within the solution will be set forth.

Compounds of magnesium and of phosphoric acid are capable of reacting with each other to produce hydrated magnesium phosphate in a form that will absorb ammonia. For example a quantity of liquor, amounting to 100 cubic meters and containing 50 kilograms of ammonia in solution, is treated with 598 kilograms of a solution of magnesium chloride and with 1054 kilograms of a solution of sodium phosphate. As a result of the reactions produced magnesium ammonium phosphate is separated out as a crystalline precipitate. The corresponding equation reads as follows:

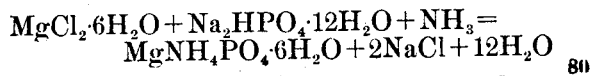

$$MgCl_2 \cdot 6H_2O + Na_2HPO_4 \cdot 12H_2O + NH_3 = MgNH_4PO_4 \cdot 6H_2O + 2NaCl + 12H_2O$$

The specific magnesium compound and the phosphate named are not essential to the process and other magnesium compounds and other phosphates may be substituted if desired.

An example of other compounds which will react in solution to produce a substance that will precipitate ammonia comprises primary magnesium phosphate, magnesium sulphate and calcined soda. If 100 cubic meters of weak ammonia solution are treated with 321 kilograms of primary magnesium phosphate, 176 kilograms of magnesium sulphate, and 156 kilograms of calcined soda, 720 kilograms of magnesium ammonium phosphate are produced according to the following equation:

$$Mg(H_2PO_4)_2 + MgSO_4 + Na_2CO_3 + 2NH_3 + 5H_2O = 2MgNH_4PO_4 \cdot 6H_2O + Na_2SO_4 + CO_2.$$

Still another example comprises the use of super-phosphate and magnesium carbonate as compounds with which to treat the ammonia solution. If 100 cubic meters of weak ammonia liquor are treated with 385 kilograms of super-phosphate and 257 kilograms of magnesium carbonate, 720 kilograms of magnesium ammonium phosphate are produced according to the following equation:

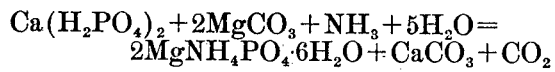

It will be seen that I have provided a quantitative process for precipitating ammonia from solution by treating the solution with compounds which will react with each other in the solution to produce a substance which will substantially completely precipitate the ammonia even when the concentration is very low.

It will be seen that another feature of the invention is to produce magnesium phosphate in a form which has the power to absorb ammonia. The hydrated magnesium phosphate formed by the reactions within the solution has this characteristic.

In carrying out the process I may employ the batch type of operation but I preferably carry out the process by a continuous type of operation. This method of operation is made possible by the rapidity with which the reactions take place so that the addition of the reagents to a mass of weak ammonia solution flowing through a pipe is sufficient to bring about the desired reactions and precipitate the ammonia. It will be clear that the reagents may be added in regulated amounts to the flowing stream in order to carry out the quantitative measure of operation of the process. The ammonia solution may conveniently be treated by causing it to flow into a settling tower from which the liquid may be withdrawn substantially free from ammonia compounds.

It will be clear that other methods of separating the precipitated material from the liquid may be employed, such as, for example, filtration, centrifugation, and the like.

What I claim is:

1. A process for recovering ammonia from the precipitant used in the manufacture of artificial filaments by the cuprammonia process which comprises treating the solution with substances capable of reacting with each other to produce magnesium phosphate in a form having the power to unite with ammonia.

2. A process for recovering ammonia from the precipitant used in the manufacture of artificial filaments by the cuprammonia process which comprises treating the solution with substances capable of reacting with each other in the solution to produce hydrated magnesium phosphate.

3. A process for recovering ammonia from the precipitant used in the manufacture of artificial filaments by the cuprammonia process which comprises treating the solution with substances capable of reacting with each other and with the ammonia to form magnesuim ammonium phosphate.

4. A process for recovering ammonia from the precipitant used in the manufacture of artificial filaments by the cuprammonia process which comprises adding to the solution a phosphoric acid compound and a compound of magnesium, whereby to produce hydrated magnesium phosphate.

5. A process for recovering ammonia from the precipitant used in the manufacture of artificial filaments by the cuprammonia process which includes the step of adding to the solution magnesium chloride and sodium phosphate.

6. A process for recovering ammonia from the precipitant used in the manufacture of artificial filaments by the cuprammonia process which includes the step of adding to the solution a magnesium compound and a phosphate.

7. A process for recovering ammonia from the precipitant used in the manufacture of artificial filaments by the cuprammonia process which includes the step of adding to the solution a magnesium compound and an acid phosphate.

8. A process for recovering ammonia from the precipitant used in the manufacture of artificial filaments by the cuprammonia process which includes the step of adding to the solution a magnesium compound and a monophosphate and an alkali.

9. A process for recovering ammonia from the precipitant used in the manufacture of artificial filaments by the cuprammonia process which includes the step of adding to the solution compounds containing respectively magnesium and the phosphate radical.

HUGO HOFMANN.